United States Patent
Yonezawa et al.

(10) Patent No.: US 12,024,230 B2
(45) Date of Patent: Jul. 2, 2024

(54) INSTRUMENT PANEL SUPPORT APPARATUS

(71) Applicant: Honda Access Corp., Niiza (JP)

(72) Inventors: Takumi Yonezawa, Niiza (JP); Tomoya Akutsu, Niiza (JP)

(73) Assignee: Honda Access Corp., Saitama (JP)

( * ) Notice: Subject to any disclaimer, the term of this patent is extended or adjusted under 35 U.S.C. 154(b) by 408 days.

(21) Appl. No.: 17/503,881

(22) Filed: Oct. 18, 2021

(65) Prior Publication Data

US 2022/0177042 A1 Jun. 9, 2022

(30) Foreign Application Priority Data

Dec. 9, 2020 (JP) .................. 2020-203866

(51) Int. Cl.
*B62D 25/14* (2006.01)
*B60K 35/00* (2024.01)
*B60K 35/28* (2024.01)
*B60R 11/00* (2006.01)

(52) U.S. Cl.
CPC .............. *B62D 25/14* (2013.01); *B60K 35/00* (2013.01); *B60K 35/28* (2024.01); *B60K 2360/166* (2024.01); *B60R 2011/0005* (2013.01)

(58) Field of Classification Search
CPC ............ B62D 25/14; B60R 2011/0005; B60R 2011/0059; B60R 2011/0071; B60R 11/0258; B60K 35/00; B60K 35/28; B60K 35/50; B60K 2300/166
USPC ....................................... 296/70, 72; 180/90
See application file for complete search history.

(56) References Cited

U.S. PATENT DOCUMENTS

| 4,867,398 | A | * | 9/1989 | Butcher | .............. B60R 11/0205 248/27.3 |
| 2010/0085494 | A1 | * | 4/2010 | Shimizu | ................. B60K 35/00 348/837 |
| 2012/0250280 | A1 | * | 10/2012 | Sano | ..................... G01D 11/24 361/760 |

(Continued)

FOREIGN PATENT DOCUMENTS

| JP | 2018122658 A | 8/2018 |
| JP | 2019217849 A | 12/2019 |

OTHER PUBLICATIONS

Japanese Office action; Application 2020-203866; Nov. 8, 2022.

*Primary Examiner* — Gregory A Blankenship
(74) *Attorney, Agent, or Firm* — Duft & Bornsen, PC

(57) ABSTRACT

An instrument panel support apparatus including a support portion configured by an on-board equipment or a fixing member fixed to the on-board equipment, and a connecting portion connecting the support portion and the end of the instrument panel. The connecting portion includes an engaging portion provided at the end of the instrument panel, and an engaged portion provided at the support portion so as to be engaged with the engaging portion when the instrument panel and the support portion are connected by pushing of one of the instrument panel and the support portion to the other of the instrument panel and the support portion in a predetermined direction. The engaging portion is configured to engage with the engaged portion in contact with the engaged portion or a periphery of the engaged portion by an elastic deformation of the engaging portion in the connecting portion.

9 Claims, 11 Drawing Sheets

(56) References Cited

U.S. PATENT DOCUMENTS

| | | | |
|---|---|---|---|
| 2015/0098172 A1* | 4/2015 | Kankiewicz | H04R 3/00 |
| | | | 361/679.01 |
| 2016/0009178 A1* | 1/2016 | Busse | B60R 11/0235 |
| | | | 361/679.21 |
| 2016/0200263 A1* | 7/2016 | An | B60R 11/02 |
| | | | 296/70 |
| 2016/0368379 A1* | 12/2016 | Larry | G02F 1/133308 |
| 2018/0215265 A1* | 8/2018 | Takeno | B60K 35/50 |
| 2021/0188188 A1* | 6/2021 | Kim | G02B 27/0149 |
| 2021/0215934 A1* | 7/2021 | Mizuochi | G02B 27/0149 |
| 2022/0177042 A1* | 6/2022 | Yonezawa | B60K 35/22 |
| 2022/0185198 A1* | 6/2022 | Giusti | B60K 35/22 |
| 2022/0410814 A1* | 12/2022 | Kim | B60R 11/0229 |
| 2023/0112001 A1* | 4/2023 | Ikumi | H05K 5/0008 |
| | | | 361/679.01 |
| 2023/0247786 A1* | 8/2023 | Nakamura | G09F 21/049 |
| | | | 361/807 |
| 2023/0301001 A1* | 9/2023 | Yamagami | B60R 11/0235 |
| | | | 361/807 |

\* cited by examiner

INSTRUMENT PANEL SUPPORT APPARATUS

CROSS-REFERENCE TO RELATED APPLICATION

This application is based upon and claims the benefit of priority from Japanese Patent Application No. 2020-203866 filed on Dec. 9, 2020, the content of which is incorporated herein by reference.

BACKGROUND OF THE INVENTION

Field of the Invention

This invention relates to an instrument panel support apparatus for supporting an instrument panel from an on-board equipment.

Description of the Related Art

Conventionally, there has been a known apparatus which is configured to support an end of an instrument panel from an on-board equipment via a cover panel. Such an apparatus is described, for example, in Japanese Unexamined Patent Publication No. 2019-217849 (JP2017-217849A). In the apparatus described in JP2019-217849A, a support bracket is provided inside the end of the instrument panel, and the distal end of the support bracket is fitted into an engagement recess of the cover panel, thereby supporting the end of the instrument panel from the on-board equipment via the cover panel and the support bracket.

However, in the device described in JP2019-217849A, since the end portion of the cover panel is disposed close to an upper surface of the instrument panel, the cover panel and the instrument panel is repeatedly contacted by vibration or the like during traveling, and thus there is a possibility that noise is generated.

SUMMARY OF THE INVENTION

An aspect of the present invention is an instrument panel support apparatus configured to support an end of an instrument panel from an on-board equipment mounted on a vehicle. The instrument panel support apparatus includes a support portion configured by the on-board equipment or a fixing member fixed to the on-board equipment, and a connecting portion connecting the support portion and the end of the instrument panel. The connecting portion includes an engaging portion provided at the end of the instrument panel, and an engaged portion provided at the support portion so as to be engaged with the engaging portion when the instrument panel and the support portion are connected by pushing of one of the instrument panel and the support portion to the other of the instrument panel and the support portion in a predetermined direction. The engaging portion is configured to engage with the engaged portion in contact with the engaged portion or a periphery of the engaged portion by an elastic deformation of the engaging portion in the connecting portion.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 11B. An instrument panel support apparatus according to an embodiment of the present invention is configured to support an instrument panel from an on-board equipment. As an on-board equipment, in the following, an example of using a navigation unit provided in a central portion of the instrument panel in a front portion of the vehicle interior is described.

Figure 1:
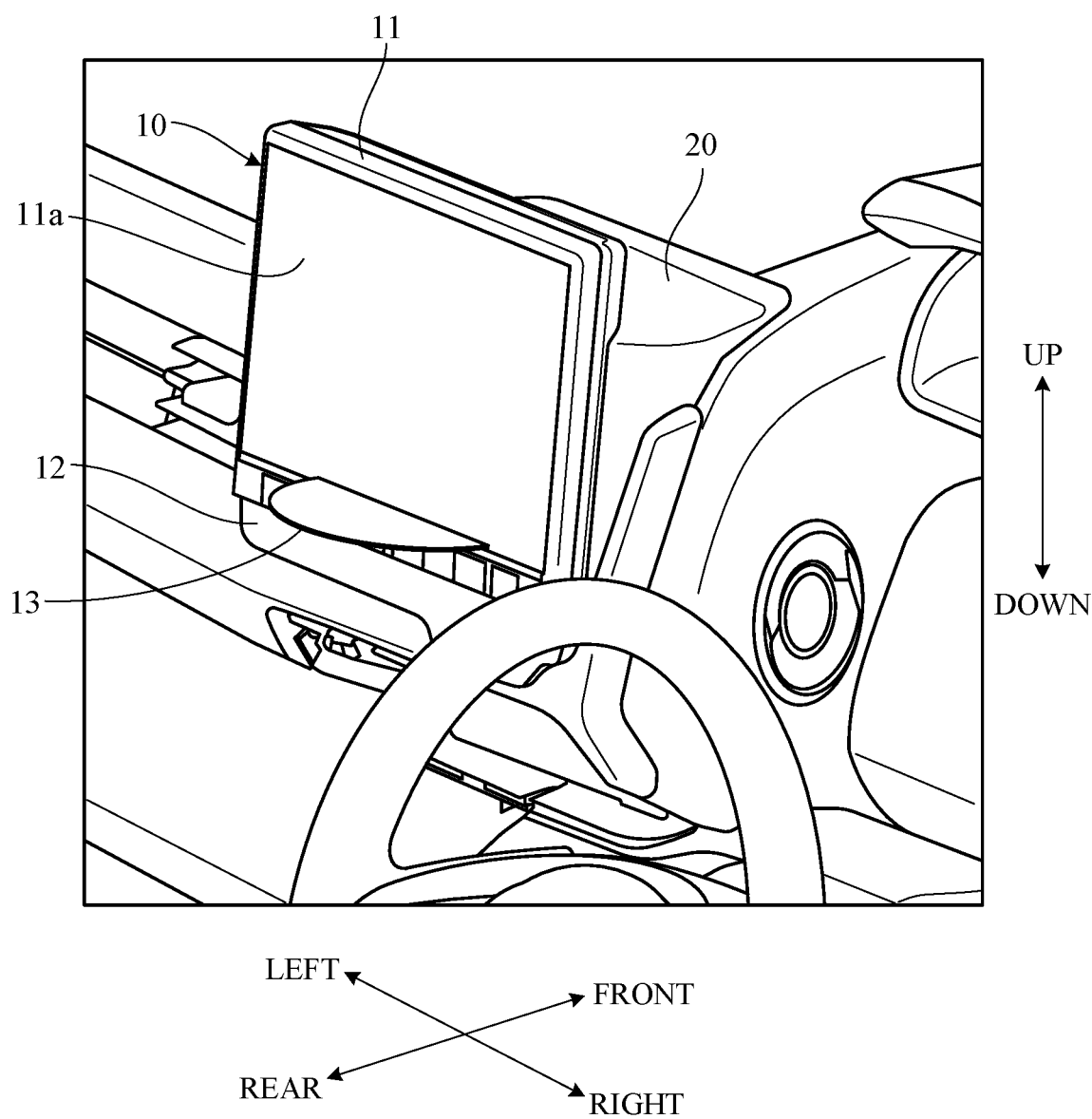
FIG. 1 is a perspective view showing a state in which a navigation unit to which an instrument panel support apparatus according to an embodiment of the present invention is applied is mounted on a vehicle.

FIG. 1 is a perspective view showing a state in which a navigation unit 10 to which the instrument panel support apparatus according to an embodiment of the present invention is applied is mounted on a vehicle. In the following, using a front-rear direction of the vehicle (vehicle length direction), a left-right direction of the vehicle (vehicle width direction) and an up-down direction of the vehicle (vehicle height direction) as a reference, for convenience, the front-rear direction, the left-right direction and the up-down direction are defined as shown in drawings.

FIG. 1 is a view of the navigation unit 10 shown from diagonally rearward in the vehicle interior. As shown in FIG. 1, the navigation unit 10 includes a display 11 having a substantially rectangular thin shape and extending in the up-down direction and the left-right direction, disposed behind an instrument panel 20 provided at the central portion in the vehicle width direction. The display 11 is disposed in an erected state where the display surface 11a faces rearward, or in an inclined state where the display surface 11a faces rearward and slightly upward. A road map information, a route guide information to a destination, and an image captured by an in-vehicle camera (e.g., rear camera) are displayed on the display 11 (display surface 11a).

The navigation unit 10 includes a main body 12 provided integrally with the display 11 at the bottom of the display 11 and extending rearwardly. A control circuit for controlling the display 11 is accommodated in the main body 12, and a disc 13 such as CD or DVD is detachably provided from the main body 12. The main body 12 may be provided with a radio, a CD player, a DVD player, a digital audio player, or the like, and sounds generated in these device may be output from a speaker mounted in the vehicle. That is, the navigation unit 10 can also be used as car audio. In this case, the display 11 may display various types of guidance information, video received by the television broadcast receiver, and the like.

Figure 2:
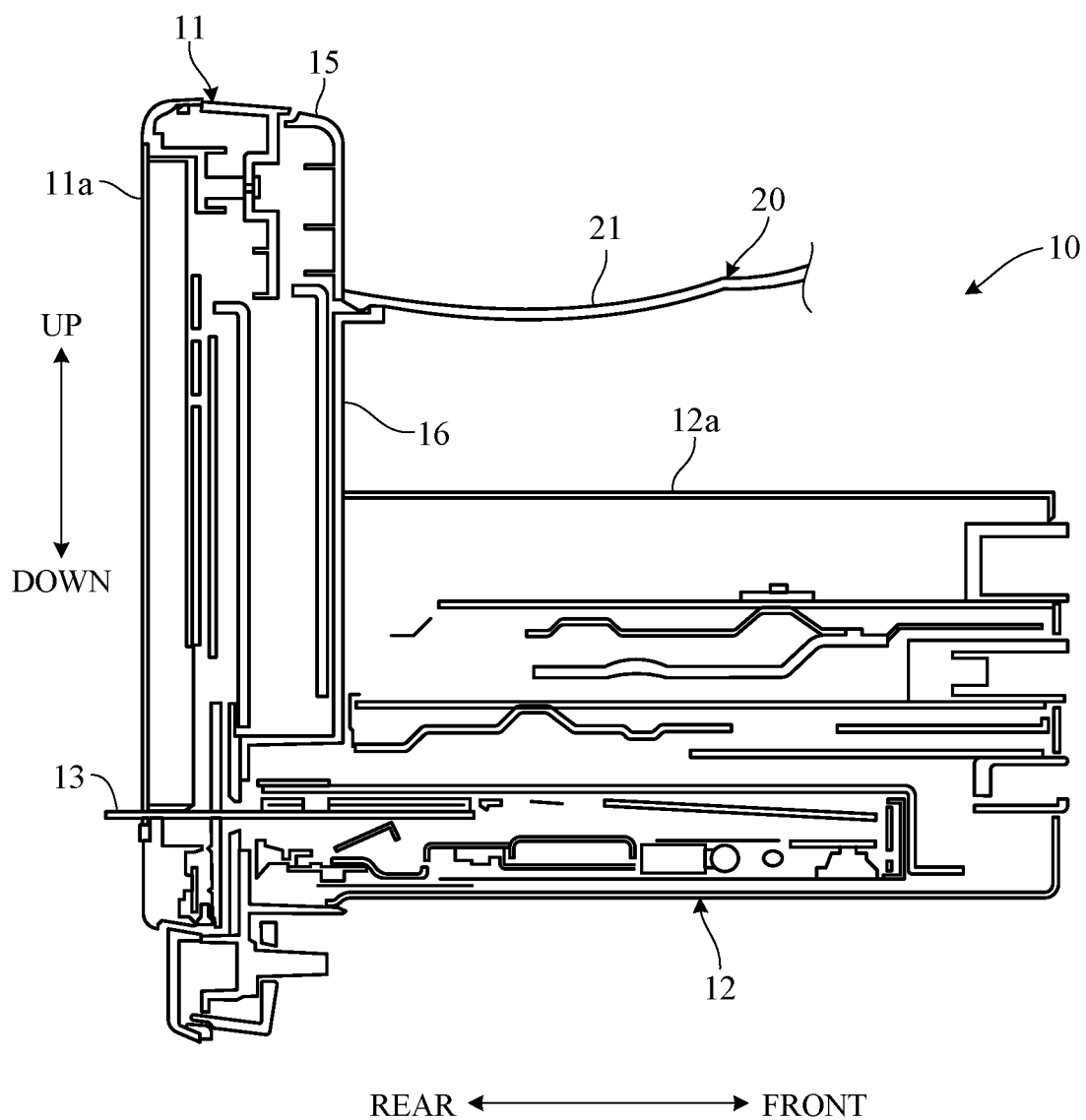
FIG. 2 is a cross-sectional view showing a main configuration of the navigation unit in FIG. 1.

FIG. 2 is a cross-sectional view of the navigation unit 10 along the vertical direction (up-down direction). As shown in FIG. 2, the display 11 is surrounded by a housing 15. The housing 15 is a molded product made of resin, and has a front wall 16 extending in the up-down direction and the left-right direction on the front surface thereof. The upper surface 12a of the main body 12 extends forward substantially horizontally from a predetermined position of the front wall 16 corresponding to the middle portion in the up-down direction of the display 11. Above the upper surface 12a of the main body 12, the instrument panel 20 is disposed. The instrument panel 20 is formed in a substantially rectangular frame shape as a whole. In FIG. 2, the instrument panel 20 is cut halfway.

Figure 3:
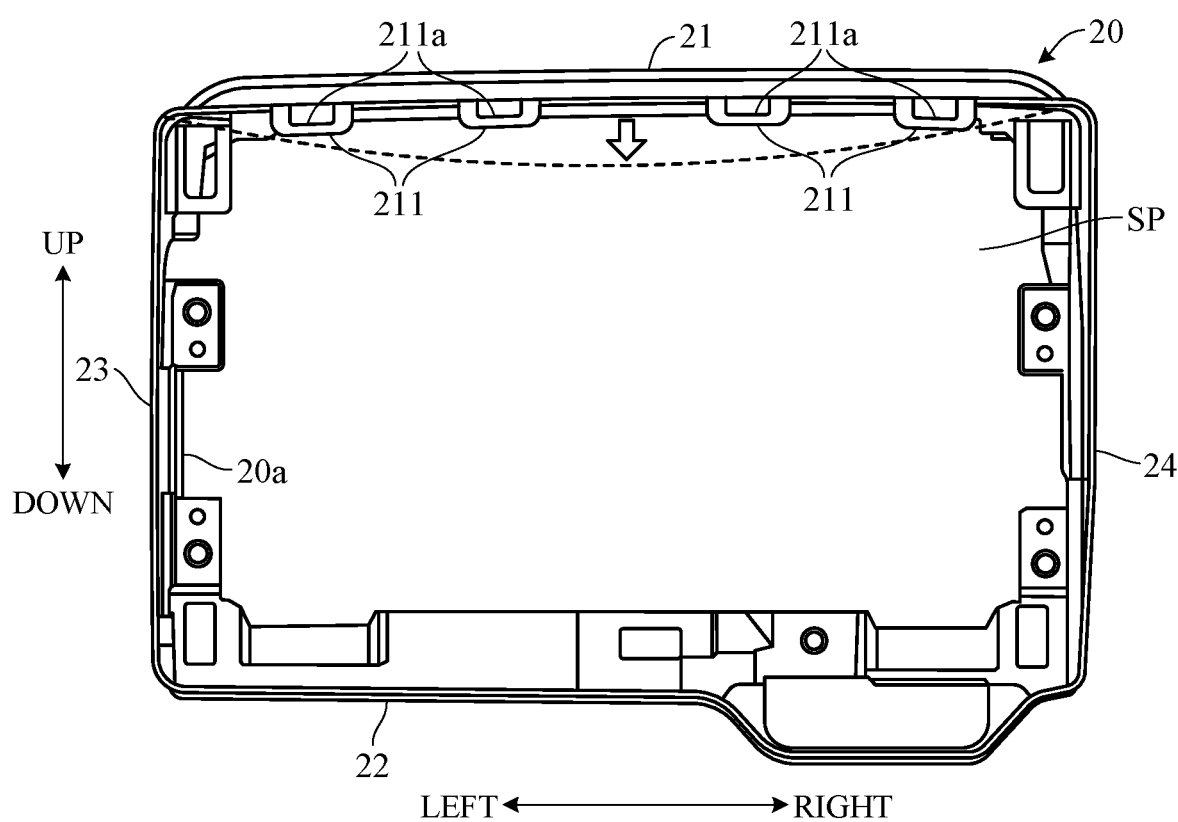
FIG. 3 is a front view showing an overall configuration of an instrument panel in FIG. 1.

FIG. 3 is a front view showing the overall configuration of the instrument panel 20 (view from the rear). As shown in FIG. 3, a substantially rectangular opening 20a is provided at the rear end portion of the instrument panel 20. More specifically, the instrument panel 20 has a pair of upper and lower panel portions extending in the horizontal direction, i.e. an upper wall 21 and a bottom wall 22, and a pair of left and right panel portions extending in the vertical direction, i.e. a left side wall 23 and a right side wall 24. Inside the instrument panel 20, a substantially box-shaped housing space SP surrounded by these upper wall 21, bottom wall 22 and side walls 23 and 24 is formed so as to be continuous with the opening 20a.

Figure 4:
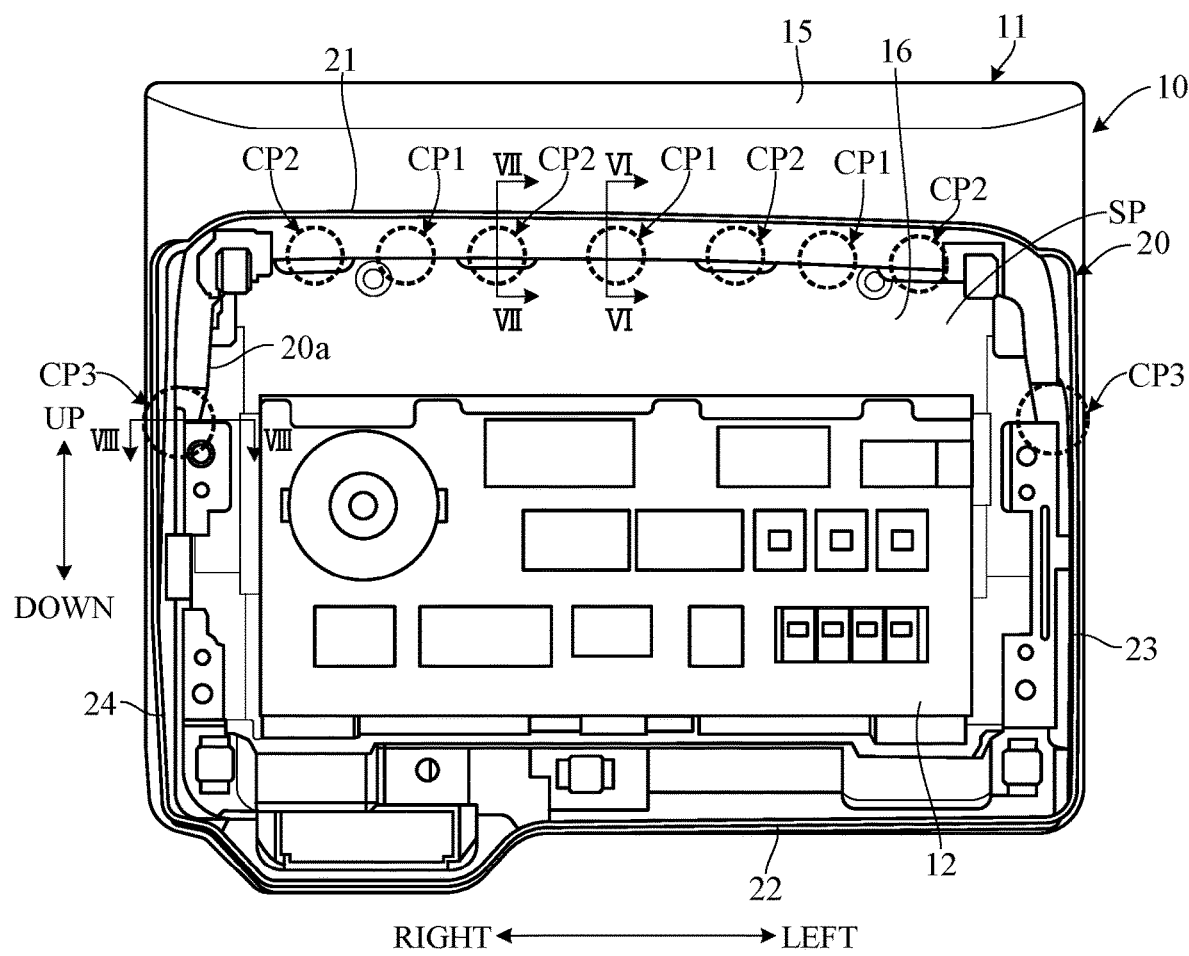
FIG. 4 is a rear view showing a state in which the instrument panel is attached to the rear surface of the navigation unit in FIG. 1.

FIG. 4 is a rear view showing a state in which the instrument panel 20 is attached to the rear surface (front wall 16) of the navigation unit 10 (view from the front). As shown in FIG. 4, the main body 12 of the navigation unit 10 inserted through the opening 20a is accommodated in the housing space SP of the instrument panel 20. In this state, the rear end portion of the instrument panel 20 is supported by the front wall 16 on the rear surface of the display 11.

In the instrument panel support apparatus, the instrument panel 20 is integrally molded using a resin as a constituent material. Therefore, in the instrument panel 20, there is a possibility that the upper wall 21 bends and deforms inward (downward) at the stage of resin molding or due to aged deterioration, as shown by an arrow and a dotted line in FIG. 3. As a result, it may be difficult to support the instrument panel 20 from a predetermined position of the navigation unit 10 (e.g., the front wall 16), as shown in FIG. 4.

Further, when supporting the instrument panel 20 from the navigation unit 10, the instrument panel 20 and the navigation unit 10 repeatedly contact by vibration or the like during traveling, and there is a possibility that noise occurs. In particular, when the instrument panel 20 is deformed as shown in the dotted line in FIG. 3, displacement in the positional relationship between the instrument panel 20 and the navigation unit 10 easily occurs, and noise is likely to occur. Therefore, in the present embodiment, in order to suppress the generation of noise due to contact between the instrument panel 20 and the navigation unit 10, the instrument panel support device is configured as follows.

Figure 5:
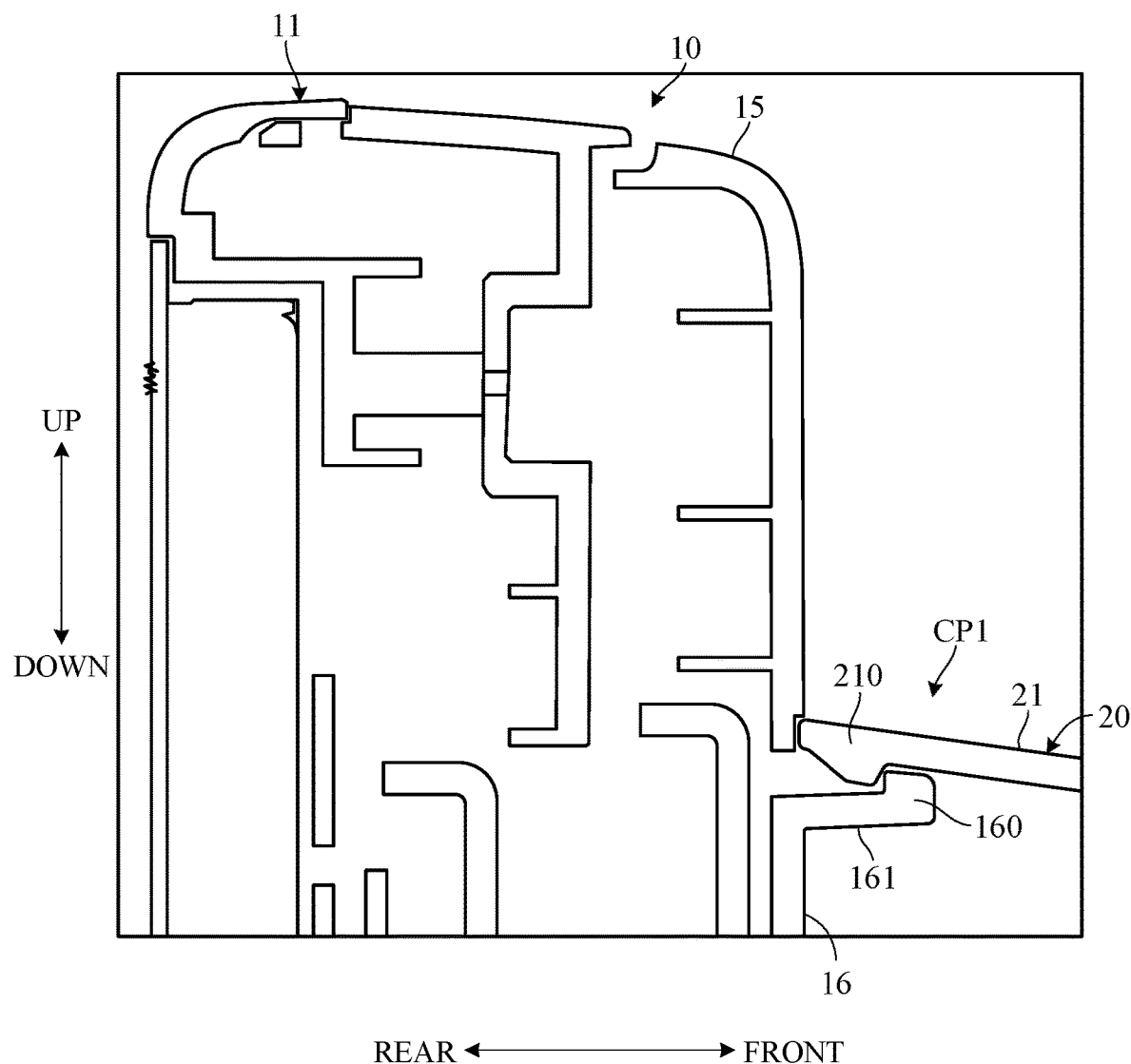
FIG. 5 is an enlarged view showing a main configuration in FIG. 2.

FIG. 5 is a diagram showing a configuration of a main part of the instrument panel support apparatus according to the present embodiment (enlarged view of main part in FIG. 2), and shows a configuration of a connecting portion CP1 which connects the rear end portion of the upper wall 21 of the instrument panel 20 and the housing 15 of the display 11. As shown in FIG. 5, the connecting portion CP1 has a claw portion 210 provided at the rear end portion of the upper wall 21 and a stepped portion 160 provided at the front wall 16 of the housing 15. The claw portion 210 is projected downward from the bottom surface of the upper wall 21. The stepped portion 160 is provided at the front end portion of a protruding portion 161 which protrudes forward corresponding to the position of the claw portion 210 so as to protrude above the upper surface of the protruding portion 161.

As shown in FIG. 4, the connecting portions CP1 (claw portion 210 and stepped portion 160) are provided at equal intervals at 3 places in the left-right direction. That is, the connecting portions CP1 are provided at a center in the left-right direction of the instrument panel 20 and on the right and left sides thereof, respectively.

Figure 6A:
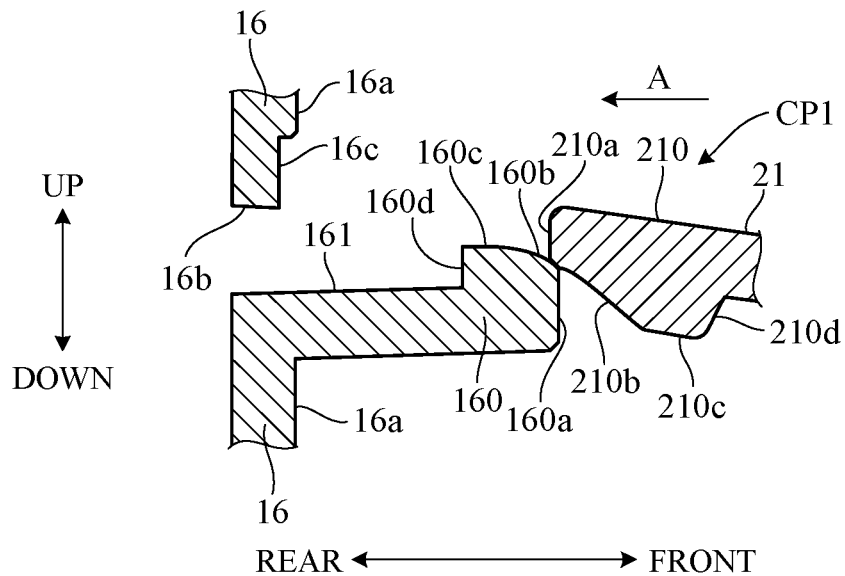
FIG. 6A is a diagram showing an engagement operation in a first connecting portion included in the instrument panel support apparatus according to the embodiment of the invention.
Figure 6B:
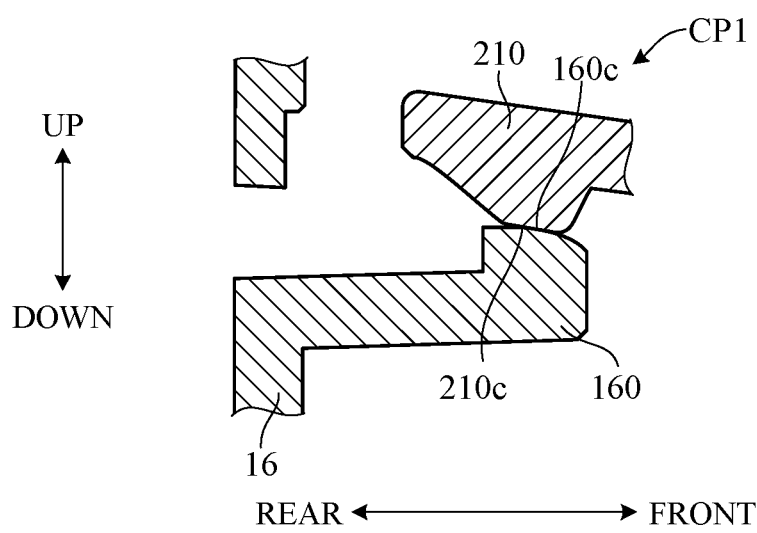
FIG. 6B is a diagram showing an engagement operation following the operation in FIG. 6A.
Figure 6C:
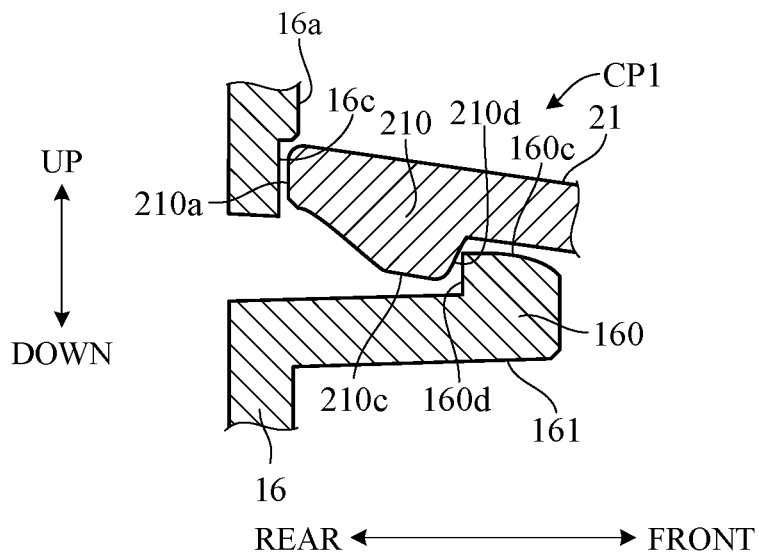
FIG. 6C is a diagram showing an engagement operation following the operation in FIG. 6B.

FIG. 6A to FIG. 6C are diagrams showing an engagement operation between the claw portion 210 and the stepped portion 160 in the connecting portion CP1 of the navigation unit 10 and the instrument panel 20, and correspond to cross-sectional views taken along line VI-VI in FIG. 4. As shown in FIG. 6A, the claw portion 210 has a surface at its tip, i.e., a rear end surface 210a, a tapered surface 210b extending downward and forward inclined from the rear end surface 210a, a bottom surface 210c extending from the front end of the tapered surface 210b substantially parallel to the upper surface of the upper wall 21, and a front end surface 210d extending upward from the front end of the bottom surface 210c.

The stepped portion 160 is provided at the front end of the protruding portion 161 which protrudes forward from the front surface 16a of the front wall 16. The stepped portion 160 has a surface at its tip, i.e., a front end surface 160a, a tapered surface 160b extending obliquely upward and rearward from the front end surface 160a, an upper surface 160c extending rearward substantially horizontally from the rear end of the tapered surface 160b, and a rear end surface 160d extending downward from the rear end of the upper surface 160c. An opening 16b penetrating in the front-rear direction above the protruding portion 161 is provided at front wall 16. A recess 16c is provided continuously to the opening 16b on the front surface 16a of the front wall 16.

When the instrument panel 20 is attached to the navigation unit 10, as shown by the arrow A in FIG. 6A, the claw portion 210 is pushed toward the stepped portion 160 from the front of the front wall 16. In this case, first, the tapered surface 210b of the claw portion 210 comes into contact with the tapered surface 160b of the stepped portion 160, and the claw portion 210 mainly moves upward of the stepped portion 160 by an elastic deformation of the upper wall 21 while the tapered surfaces 210b and 160b slide with each other. That is, the claw portion 210 is pushed upward by the stepped portion 160. As a result, the downward deflection of the upper wall 21 is corrected. Next, as shown in FIG. 6B, the bottom surface 210c of the claw portion 210 abuts the upper surface 160c of the stepped portion 160, and the claw portion 210 moves rearward while the bottom surface 210c and the upper surface 160c slide with each other.

Next, as shown in FIG. 6C, the claw portion 210 rides over the stepped portion 160. That is, the front end surface 210d of the claw portion 210 moves forward of the rear end surface 160d of the stepped portion 160. At this time, the claw portion 210 moves downward by the restoring force from the elastic deformation, and the tip of the claw portion 210 (rear end portion) is engaged with the recess 16c on the front surface 16a of the front wall 16. Thus the position of the instrument panel 20 is restrained in the front-rear direction.

In FIG. 6C, for convenience, the distal end portion of the instrument panel 20 (claw portion 210 and the upper wall 21) is shown apart from the front wall 16 (stepped portion 160 and the protruding portion 161 and the recess 16c). However, actually the distal end portion of the instrument panel 20 is pressed against the front wall 16 side by the restoring force, and the distal end portion of the instrument panel 20 is in contact with the front wall 16. For example, the bottom surface of the upper wall 21 is in contact with the upper surface 160c of the stepped portion 160, the bottom surface 210c of the claw portion 210 is in contact with the upper surface of the protruding portion 161, or the rear end surface 210a of the claw portion 210 is in contact with the bottom surface of the recess 16c.

Thus in the embodiment, the connecting portion CP1 of the navigation unit 10 and the instrument panel 20 is configured so that the claw portion 210 is pushed upward from the stepped portion 160 during the attaching operation of the instrument panel 20. As a result, when the upper wall 21 of the instrument panel 20 is bent downward, as shown by the dotted line in FIG. 3, the position of the upper wall 21 is corrected, and the assembly of the instrument panel 20 is facilitated. In this case, since the claw portion 210 and the stepped portion 160 is engaged by elastic deformation of the upper wall 21, the claw portion 210 and the stepped portion 160 can maintain a state in contact with each other. Therefore, it is possible to suppress the generation of noise due to repeated contact between the navigation unit 10 and the instrument panel 20 by vibration during traveling.

After assembling the instrument panel 20 to the navigation unit 10, the rear end of the instrument panel 20 is disposed above the protruding portion 161 of the front wall 16 of the navigation unit 10. As a result, it is possible to prevent the instrument panel 20 from sagging (downward deflection) due to aged deterioration, and to stably support the instrument panel 20. Further, since the claw portion 210 and the stepped portion 160 engages in the front-rear direction, it is possible to regulate the position in the front-rear direction of the instrument panel 20 with respect to the navigation unit 10. Furthermore, since the distal end portion of the claw portion 210 is engaged with the recess 16c on the front surface 16a of the front wall 16, it is possible to prevent the upward movement of the claw portion 210 by the recess 16c, and the claw portion 210 can be stably held in the engaged position.

In the present embodiment, in addition to the connecting portion CP1, a connecting portion CP2 for connecting the instrument panel 20 and the navigation unit 10 is further provided. As shown in FIG. 4, the connecting portions CP2 are provided at four places in the left-right direction, that is, alternately with the connecting portions CP1 in the left-right direction. More specifically, the connecting portions CP2 are provided between the connecting portion CP1 at the center in the left-right direction and the connecting portions CP1 at the outside in the left-right direction, and on the left-right outer side of the connecting portions CP1 at the outside in the left-right direction, respectively. As shown in FIG. 3, on the upper wall 21 of the instrument panel 20, ribs 211 is provided so as to extend downward at four positions in the left-right direction corresponding to the connecting portion CP2. The rib 211 is provided with an opening 211a having a substantially rectangular shape when viewed from the front, which penetrates the rib 211 in the front-rear direction.

Figure 7A:
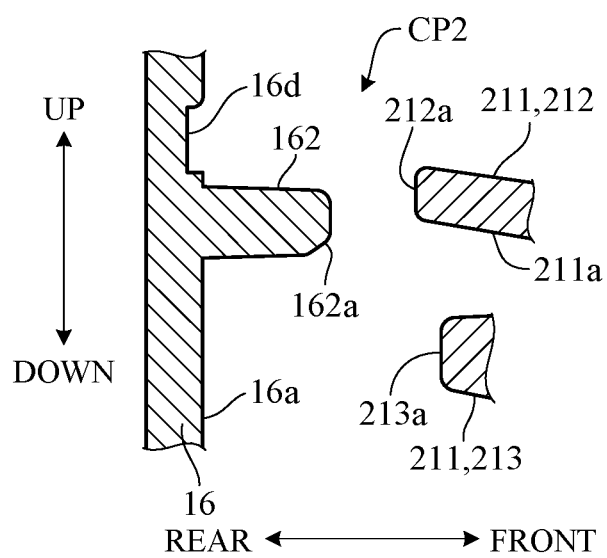
FIG. 7A is a diagram showing an engagement operation in a second connecting portion included in the instrument panel support apparatus according to the embodiment of the invention.
Figure 7B:
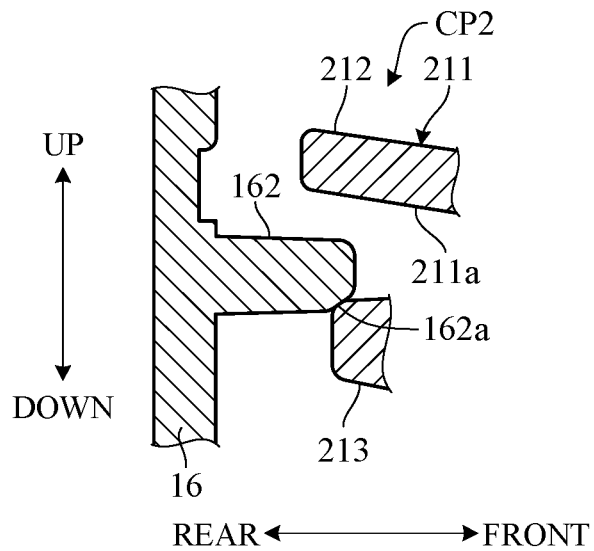
FIG. 7B is a diagram showing an engagement operation following the operation in FIG. 7A.
Figure 7C:
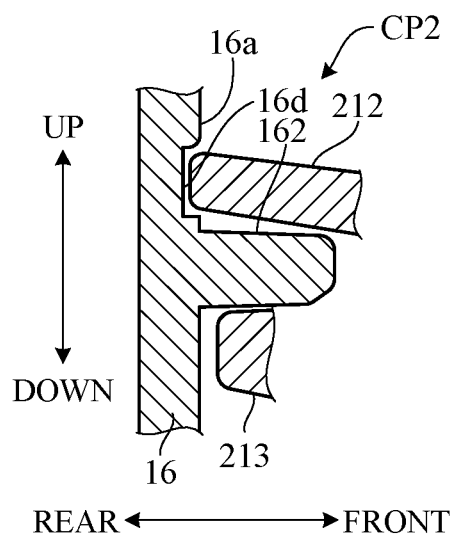
FIG. 7C is a diagram showing an engagement operation following the operation in FIG. 7B.

FIG. 7A to FIG. 7C are diagrams showing the engagement operation of the rib 211 at the connecting portion CP2 of the navigation unit 10 and the instrument panel 20, and correspond to cross-sectional views taken along line VII-VII in FIG. 4. FIG. 7A to FIG. 7C correspond to the engagement operation of the connecting portion CP1 in FIG. 6A to FIG. 6C. As shown in FIG. 7A, the rib 211 has an upper rib 212 on the upper side and a lower rib 213 on the lower side of the opening 211a. The upper rib 212 protrudes rearward from the lower rib 213, and the rear end surface 212a of the upper rib 212 is positioned rearward of the rear end surface 213a of the lower rib 213. The upper rib 212 is positioned at substantially the same height in the up-down direction as the upper wall 21 in FIG. 6A.

Protruding portions 162 corresponding to the position of the ribs 211 are provided so as to protrude forward on the front surface 16a of the front wall 16. The thickness of the protruding portion 162 (length in the up-down direction) is shorter than the length in the up-down direction of the opening 211a of the rib 211. A tapered surface 162a is formed at a lower corner of the front end portion of the protruding portion 162. A recess 16d is provided above the protruding portion 162 on the front surface 16a of the front wall 16. The position in the up-down direction of the recess 16d is substantially equal to the position in the up-down direction of the recess 16c in FIG. 6A.

When assembling the instrument panel 20 to the navigation unit 10, as shown in FIG. 6A, in a state where the distal end of the claw portion 210 has started to abut against the stepped portion 160, as shown in FIG. 7A, the rear end of the rib 211 is located in front of the front end of the protruding portion 162, the rib 211 and the protruding portion 162 are separated from each other. At this time, the opening 211a of the rib 211 is positioned below the protruding portion 162. As shown in FIG. 6B, when the claw portion 210 is rides on the stepped portion 160 and the upper wall 21 is pushed upward, as shown in FIG. 7B, the rib 211 is also pushed upward, and the upper end surface of the lower rib 213 abuts against the tapered surface 162a of the protruding portion 162. As a result, the protruding portion 162 is inserted into the opening 211a.

Thereafter, while the lower rib 213 slides along the bottom surface of the protruding portion 162, the rib 211 moves rearward. As shown in FIG. 6C, when the claw portion 210 passes over the stepped portion 160 and the distal end of the claw portion 210 is engaged with the recess 16c, as shown in FIG. 7C, the distal end of the upper rib 212 (rear end portion) is engaged with the recess 16d on the front surface 16a of the front wall 16. In FIG. 7C, for convenience, although the rib 211 is shown apart from the protruding portion 162 and the recess 16d, actually the rib 211 is in contact with the protruding portion 162 and the recess 16d.

Since the protruding portion 162 is inserted into the opening 211a of the rib 211 at the time of assembling the instrument panel 20, the instrument panel 20 can be accurately positioned and assembled to the navigation unit 10. In particular, in the connecting portion CP1, the bottom surface 210c of the claw portion 210 abuts the upper surface 10c of the stepped portion 160 to restrict the downward movement of the instrument panel 20 (FIG. 6B), whereas in the connecting portion CP2, the upper surface of the lower ribs 213 abuts the bottom surface of the protruding portion 162 to restrict the upward movement of the instrument panel 20 (FIG. 7B).

Therefore, it is possible to increase the vertical positional accuracy of the instrument panel 20 with respect to the navigation unit 10, and thus it is possible to reliably contact the navigation unit 10 and the instrument panel 20 at a predetermined position. As a result, it is possible to keep the contact state at the predetermined position between the navigation unit 10 and the instrument panel 20, and thus it is possible to suppress the generation of noise by the repeat contact between the navigation unit 10 and the instrument panel 20.

Figure 8A:
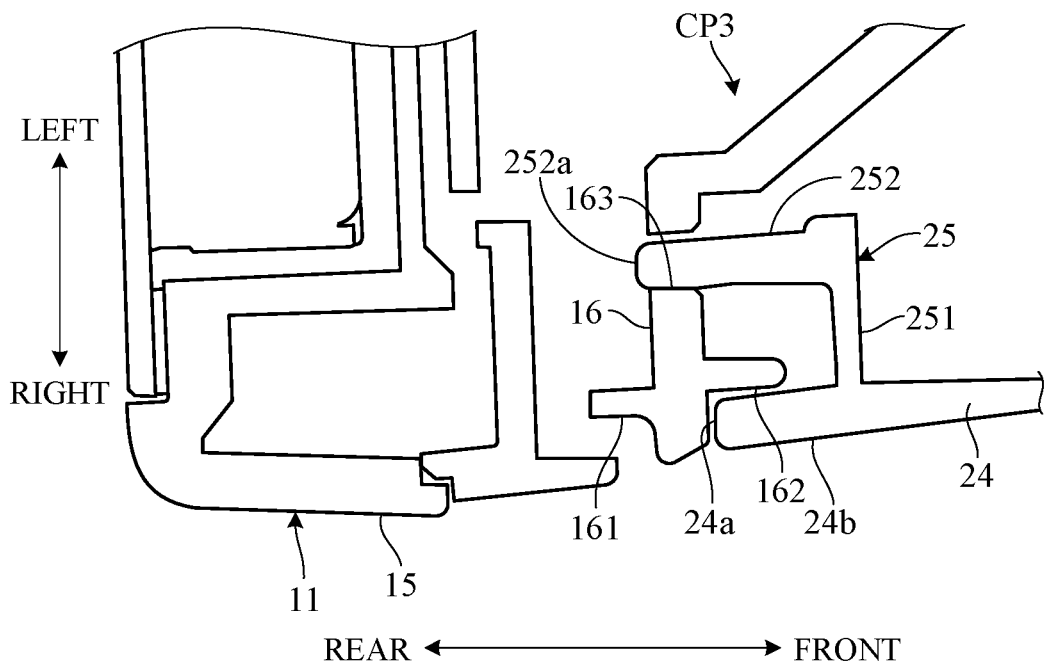
FIG. 8A is a cross-sectional view taken along line VIII-VIII in FIG. 4.

As shown in FIG. 4, in the present embodiment, not only at the upper wall 21 of the instrument panel 20, but also at the left and right side walls 23 and 24, the connecting portions CP3 for connecting the navigation unit 10 are provided. FIG. 8A is a cross-sectional view taken along line VIII-VIII in FIG. 4, showing the configuration of the connecting portion CP3 in the right side wall 24. Although not shown, the configuration of the connecting portion CP3 in the left side wall 23 is also the same as that in FIG. 8A.

As shown in FIG. 8A, on the front and rear surfaces of the front wall 16 of the housing 15 of the navigation unit 10, protruding portions 161 and 162 are protruded in the front-rear direction over the up-down direction, respectively. The protruding portion 161 is positioned at the left of the right end surface of the front wall 16, and the protruding portion 162 is positioned further to the left of the protruding portion 161. An opening 163 penetrating the front wall 16 in the front-rear direction is provided at the left of the protruding portion 162 of the front wall 16. On the other hand, a bracket 25 is projected toward the left on the left surface of the side wall 24. The bracket 25 has a base portion 251 extending leftward from the left surface of the side wall 24 and a protruding portion 252 extending rearward from the left end of the base portion 251, and the whole is formed in a substantially L-shaped cross section. The protruding portion 252 protrudes rearward from the side wall 24, and the rear end surface 252a of the protruding portion 252 is positioned rearward of the rear end surface 24a of the side wall 24.

During assembly of the instrument panel 20, the tip of the protruding portion 252 is inserted into the opening 163 of the front wall 16. At this time, the rear end surface 252a of the protruding portion 252 is positioned rearward of the rear surface of the front wall 16, and the right surface of the protruding portion 252 abuts the right edge of the opening 163, so that the side wall 24 is positioned in the left-right direction with respect to the front wall 16. The contact between the protruding portion 252 and the opening 163 is a line contact or point contact, for example, rather than a surface contact.

In a state where the protruding portion 252 and the opening 163 is in contact, the rear end portion of the side wall 24 is disposed at the right of the protruding portion 162. Thus, in a state where the side wall 24 is spaced from the protruding portion 162, the outside of the protruding portion 162 is covered by the side wall 24 (referred to as a cover portion 24b) rearward of the base portion 251 of the bracket 25. Therefore, since the connecting portion CP3 (the protruding portion 252 and the opening 163) is hidden, the appearance (design property) of the instrument panel 20 from the side is improved. In particular, the side wall 24 is not used for positioning in the left-right direction, and the bracket 25 projecting so as to be spaced from the side wall 24 is used for positioning in the left-right direction, thus the side wall 24 is spaced apart from the protruding portion 162. As a result, the side wall 24 can be easily molded with priority given to the appearance from the side without generating sink on the side wall 24.

Figure 8B:
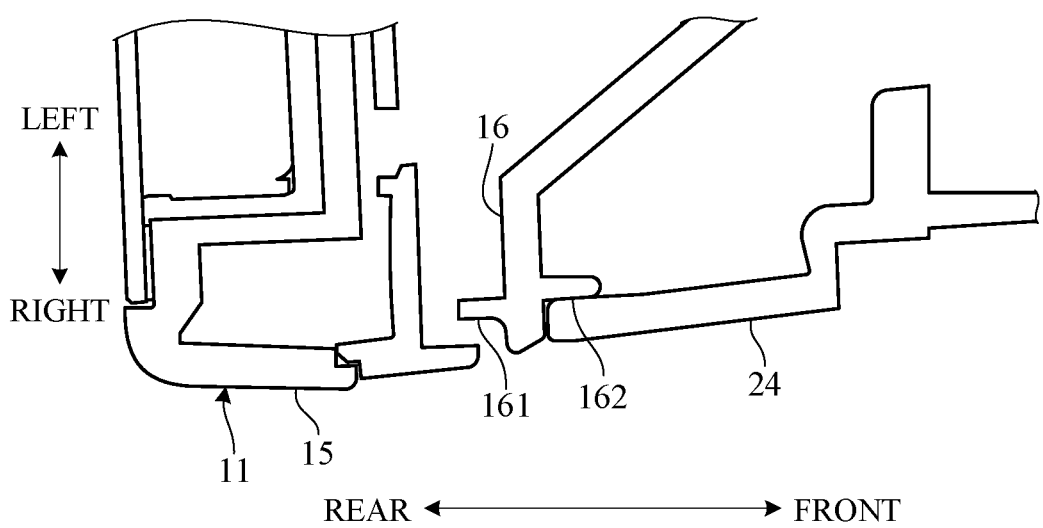
FIG. 8B is a comparative example of FIG. 8A.

On the other hand, as shown in FIG. 8B which is a comparative example of the present embodiment, when the distal end portion of the side wall 24 is configured to be fitted to the front wall 16, for example, the protruding portion 162, the side wall 24 needs to be formed by prioritizing the positioning by the side wall 24. For this reason, sink tends to occur on the side wall 24, and the design property is deteriorated.

According to the present embodiment, following functions and effects can be exerted.

(1) An instrument panel support apparatus according to the present embodiment includes a navigation unit 10 and a connecting portion CP1 connecting a front wall 16 of the navigation unit 10 and a rear end portion of the instrument panel 20, and is configured to support the rear end portion of the instrument panel 20 from the navigation unit 10 (FIG. 5). The connecting portion CP1 includes a claw portion 210 provided at the rear end portion of the instrument panel 20, and a stepped portion 160 provided on the front wall 16 of the navigation unit 10 so that the claw portion 210 is engaged with the stepped portion 160 when the instrument panel 20 and the navigation unit 10 are connected by pushing of the instrument panel 20 to the front wall 16 in the front-rear direction (FIG. 5). In the connecting portion CP1, the instrument panel 20 and the navigation unit 10 are connected in a state where the claw portion 210 is in contact with the stepped portion 160 or the periphery of the stepped portion 160 by elastic deformation of the upper wall 21 of the instrument panel 20 (FIG. 6A to FIG. 6C).

As a result, the navigation unit 10 and the instrument panel 20 constantly and stably are in contact with each other at the connecting portion CP1. Therefore, it is possible to prevent the navigation unit 10 and the instrument panel 20 from repeatedly contacting by vibration or the like during traveling, and thus it is possible to suppress the generation of noise. Further, since the rear end portion of the instrument panel 20 is pushed along the stepped portion 160 along with the pushing of the instrument panel 20, a displacement due to a deformation of the instrument panel 20 (e.g., sag) is returned to the original, and the instrument panel 20 can be easily engaged with a predetermined position of the navigation unit 10.

(2) The connecting portions CP1 are provided at a plurality of positions in the vehicle width direction (left-right direction) (FIG. 4). Thus, since the instrument panel 20 is firmly supported by the navigation unit 10, it is possible to satisfactorily suppress the generation of noise due to contact between the navigation unit 10 and the instrument panel 20.

(3) The instrument panel support apparatus further includes a connecting portion CP2 connecting the front wall 16 of the navigation unit 10 and the rear end portion of the instrument panel 20 (FIG. 7A to FIG. 7C). The connecting portion CP2 includes an opening 211a provided at the rear end portion of the instrument panel 20 and formed in a concave shape in the front-rear direction, and a protruding portion 162 provided at the front wall 16 to be fitted to the opening 211a when the instrument panel 20 and the navigation unit 10 are connected (FIG. 7A to FIG. 7C). A plurality of connecting portions CP2 are provided at a plurality of locations in the vehicle width direction, alternately with the connecting portions CP1 in the vehicle width direction. As a result, the instrument panel 20 can be supported more firmly, and the generation of noise can be effectively suppressed.

(4) The claw portion 210 is projected downward, and the distal end surface of the claw portion 210 is formed in a tapered shape (FIG. 6A to FIG. 6C). The stepped portion 160 is projected upward so that the claw portion 210 rides over the stepped portion 160 while being in contact with the stepped portion 160 when the instrument panel 20 and the navigation unit 10 are connected (FIG. 6A to FIG. 6C). Thus, with the pushing of the instrument panel 20, while correcting the displacement of the instrument panel 20, the instrument panel 20 can be held at a predetermined position with respect to the navigation unit 10.

(5) The instrument panel 20 has side walls 23 and 24 extending in the up-down direction continuously to the upper wall 21 (FIG. 3). Each of the side walls 23 and 24 has a protruding portion 252 extending in the front-rear direction, and at the front wall, an opening 163 is formed so that the side surface of the protruding portion 252 abuts an edge of the opening 163 when the instrument panel 20 and the navigation unit 10 are connected (FIG. 8A). As a result, it is possible to suppress the generation of noise due to contact with the navigation unit 10 on the side surface side of the instrument panel 20.

(6) The side wall 24 has a cover portion 24b extending parallel to the protruding portion 252 outside the protruding portion 252 in the vehicle width direction (FIG. 8A). The front wall 16 has a protruding portion 162 disposed apart from the cover portion 24b, outside the opening 163 in the left-right direction and inside the cover portion 24b in the vehicle width direction (FIG. 8A). Since the cover portion 24b is non-contact with the navigation unit 10 (such as the protruding portion 162), without generating the noise due to contact with the cover portion 24b, it is possible to improve the aesthetic appearance of the side surface of the instrument panel 20 by the cover portion 24b.

Various modifications of the above embodiment are possible. Some examples are explained in the following. Although in the above embodiment, the navigation unit 10 and the instrument panel 20 are connected by pushing of the instrument panel 20 in the front-rear direction, the may be connected by pushing in the up-down direction. Although in the above embodiment, the rear end portion of the instrument panel 20 is supported by the navigation unit 10 as an on-board equipment, more specifically, by the housing 15 of the display 11, the configuration of a support portion is not limited to this. The instrument panel 20 may be supported from the navigation unit 10 via a part such as a panel member fixed to the navigation unit 10 (an example of a fixing member).

Figure 9:
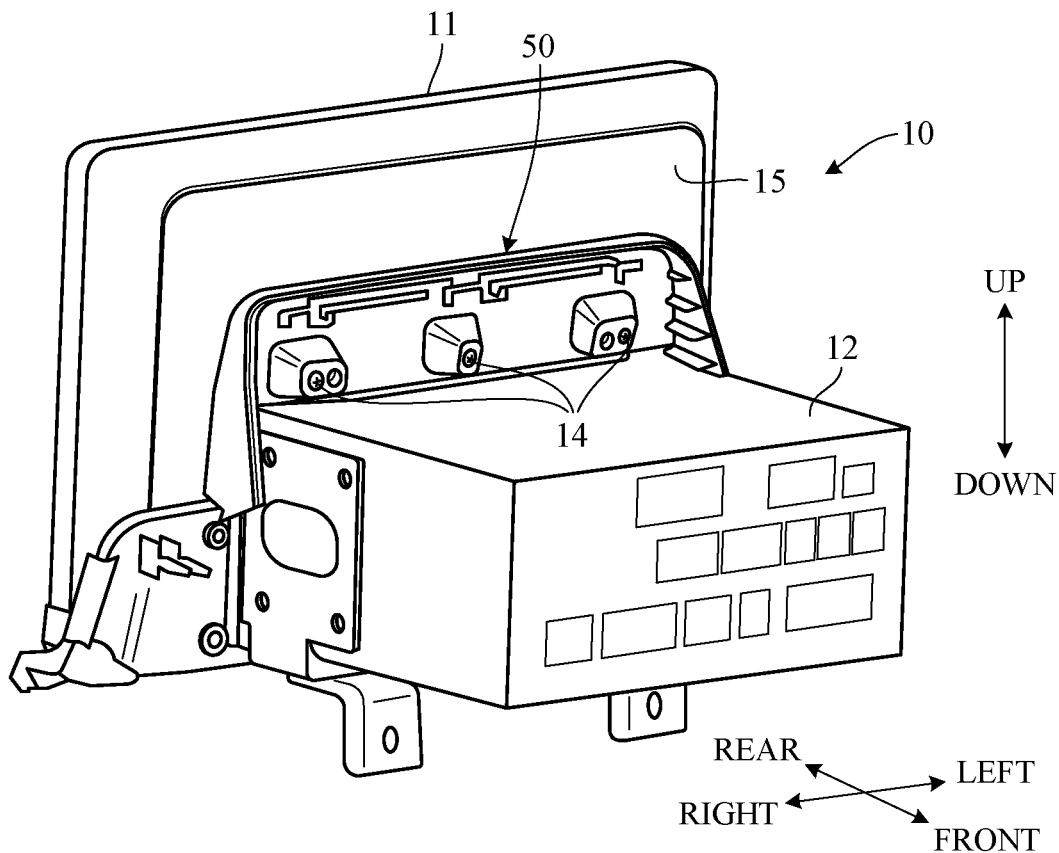
FIG. 9 is a perspective view showing a state in which a navigation panel is fixed to the navigation unit to which the instrument panel support apparatus according to the embodiment of the invention is applied.
Figure 10:
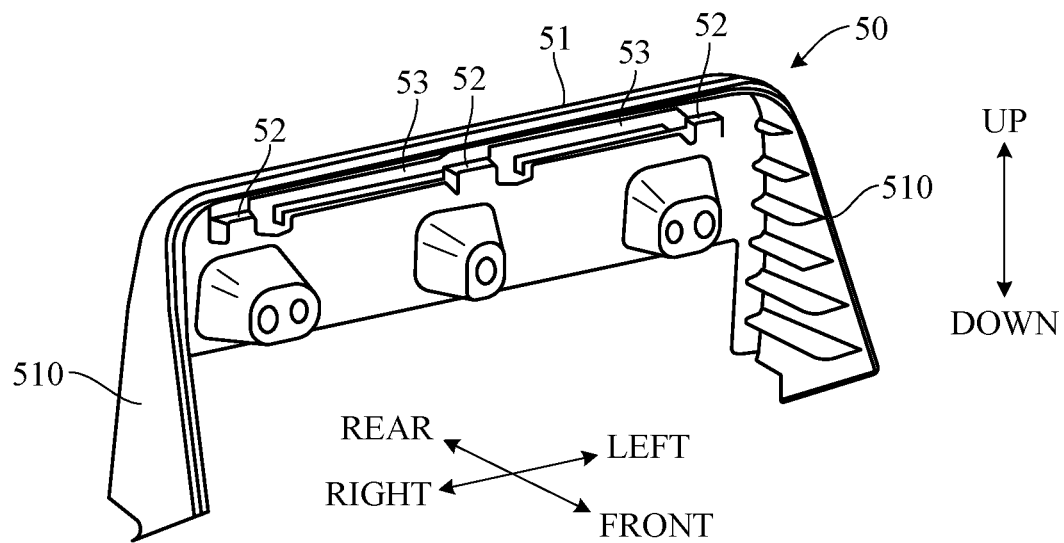
FIG. 10 is a perspective view of the navigation panel in FIG. 9.

FIG. 9 is an example in which the navigation panel 50 as a panel member is fixed to the back of the navigation unit 10 (display 11). The navigation panel 50 is fixed to the housing 15 of the back of the display 11 by bolts 14 penetrating the navigation panel 50 in the front-rear direction. FIG. 10 is a perspective view showing the configuration of the navigation panel 50 in more detail. As shown in FIG. 10, the navigation panel 50 includes a base portion 51 formed in a substantially rectangular plate-shape in front view, and a pair of left and right plate portions 510 extending downward and forward from the left and right end portions of the base portion 51. The main body 12 of the navigation unit 10 is disposed inside the left and right plate portions 510. At the upper end portion of the base portion 51, stepped portions 52 and slit holes 53 are provided alternately in the left-right direction. Although not shown, at the rear end portion of the instrument panel 20, a claw portion similar to the claw portion 210 in FIG. 6A is provided corresponding to the stepped portion 52, and a protruding portion similar to the protruding portion 162 in FIG. 7A is provided corresponding to the slit hole 53. The instrument panel 20 is pushed into each of the stepped portion 52 and the slit hole 53 from above so that the instrument panel 20 is connected to the navigation panel 50.

Figure 11A:
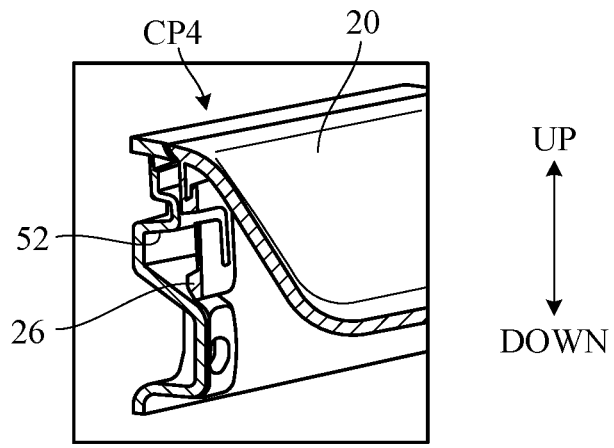
FIG. 11A is a sectional view showing a connected state between the navigation panel in FIG. 10 and the instrument panel.
Figure 11B:
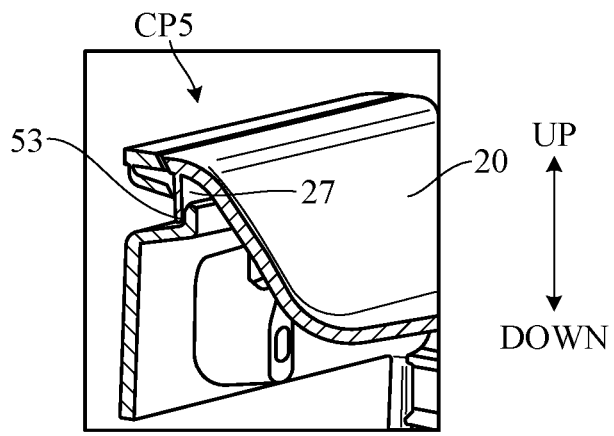
FIG. 11B a sectional view showing a connected state between the navigation panel in FIG. 10 and the instrument panel at a position different from the position in FIG. 11A.

FIG. 11A is a sectional view showing the configuration of a connecting portion CP4 between the stepped portion 52 and the instrument panel 20, and FIG. 11B is a sectional view showing the configuration of a connecting portion CP5 between the slit hole 53 and the instrument panel 20. As shown in FIG. 11A, the connecting portion CP4 has the same configuration as the connecting portion CP1 in FIG. 5, except that the pushing directions of the instrument panels 20 differ. That is, the connecting portion CP4 includes a stepped portion 52 and a pawl portion 26 provided at the instrument panel 20 so as to ride over the stepped portion 52 and engage with the stepped portion 52. As shown in FIG. 11B, the connecting portion CP5 includes a slit hole 53, and a plate portion 27 provided at the instrument panel 20 so as to be fitted into the slit hole 53.

Although in the above embodiment (FIG. 5), the claw portion 210 as an engagement protrusion at the rear end portion of the instrument panel 20, and the stepped portion 160 of the front wall 16 of the navigation unit 10 are engaged, the configurations of an engaging portion and an engaged portion are not limited to those described above. That is, as long as the engaging portion is engaged in a state of being in contact with the engaged portion or the peripheral portion of the engaged portion by elastic deformation, the configuration of a connecting portion (a first connecting portion) may be any one. Although in the above embodiment, the connecting portions CP1 are provided at three positions in the vehicle widthwise directions, the number of the connecting portions CP1 is not limited to the above.

In the above embodiment (FIGS. 7A to 7C), as a second connecting portion connecting the navigation unit 10 and the instrument panel 20, the opening 211a of the rib 211 at the rear end portion of the instrument panel 20 and the protruding portion 162 at the front wall 16 of the navigation unit 10 are fitted. However, the configurations of a fitting portion and a fitted portion are not limited to that described above. The fitting portion of the end portion of the instrument panel 20 may be formed in a convex shape. Although in the above embodiment, the connecting portion CP1,CP4 (a first connecting portion) and the connecting portion CP2,CP5 (a second connecting portion) are alternately provided at the connecting portion between the navigation unit 10 and the instrument panel 20, only the first connecting portion or only the second connecting portion may be provided there.

In the above embodiment (FIG. 8A), the bracket 25 is projected from the side walls 23 and 24 of the instrument panel 20 (sidewall portion), the protruding portion 252 protruding toward the front wall 16 is provided on the bracket 25, and the protruding portion 252 is abutted against the opening 163 of the front wall 16. However, the configurations of a protruding portion protruding extended along a predetermined direction and an abutting portion on which a side face of the protruding portion abuts are not limited to that described above. In the above embodiment, the cover portion 24b at the distal end portion of the side wall 24 is disposed apart from the protruding portion 162 (a wall portion). However, the configurations of a cover portion and a wall portion are not limited thereto.

Although in the above embodiment, the instrument panel 20 is supported from the navigation unit 10, the end portion of the instrument panel may be supported from another on-board equipment. In other words, the on-board equipment to which the present invention is applied is not limited to those described above.

The above embodiment can be combined as desired with one or more of the above modifications. The modifications can also be combined with one another.

According to the present invention, it is possible to suppress a generation of noise due to contact between an instrument panel and a part around the instrument panel.

Above, while the present invention has been described with reference to the preferred embodiments thereof, it will be understood, by those skilled in the art, that various changes and modifications may be made thereto without departing from the scope of the appended claims.

What is claimed is:

1. An instrument panel support apparatus configured to support an end of an instrument panel from on-board equipment mounted on a vehicle, the instrument panel support apparatus comprising:
   a support portion configured by the on-board equipment or a fixing member fixed to the on-board equipment; and
   a connecting portion connecting the support portion and the end of the instrument panel, wherein
   the connecting portion includes
      an engaging portion provided at the end of the instrument panel, and
      an engaged portion provided at the support portion so as to be engaged with the engaging portion when the instrument panel and the support portion are connected by pushing of one of the instrument panel and the support portion to the other of the instrument panel and the support portion in a predetermined direction,
   the engaging portion is configured to engage with the engaged portion in contact with the engaged portion or a periphery of the engaged portion by an elastic deformation of the engaging portion in the connecting portion,
   the instrument panel includes a side wall portion extended in a vertical direction,
   the side wall portion includes a protruding portion extended along the predetermined direction, and
   the support portion includes an abutting portion on which a side face of the protruding portion abuts when the instrument panel and the support portion are connected.

2. The instrument panel support apparatus according to claim 1, comprising a plurality of connecting portions, each of the plurality of connecting portions being the connecting portion, wherein
the plurality of connecting portions are provided at a plurality of positions along a width direction of the vehicle.

3. The instrument panel support apparatus according to claim 2, wherein
the plurality of connecting portion are first connecting portions,
the instrument panel support apparatus further comprises a plurality of second connecting portions connecting the support portion and the end of the instrument panel,
each of the plurality of second connecting portions includes
   a fitting portion provided at the end of the instrument panel and formed in a concave shape or a convex shape, and
   a fitted portion provided at the support portion to be fitted to the fitting portion when the instrument panel and the support portion are connected, and
the plurality of second connecting portions are provided alternately with the plurality of first connecting portions at a plurality of positions along the width direction.

4. The instrument panel support apparatus according to claim 1, wherein
the engaging portion includes an engagement protrusion having a distal end surface formed in a tapered shape, and
the engaged portion includes a stepped portion ridden over by the engaging portion while contacting the engaging portion when the instrument panel and the support portion are connected.

5. The instrument panel support apparatus according to claim 1, wherein
the side wall portion further includes a cover portion extended in parallel with the protruding portion outside the protruding portion in a width direction of the vehicle, and
the support portion includes a wall portion provided apart from the cover portion outside the abutting portion in the width direction and inside the cover portion in the width direction.

6. The instrument panel support apparatus according to claim 1, wherein
the engaging portion is provided at an end of an upper wall of the instrument panel, and
the engaged portion is provided so as to push the engaging portion upward when the instrument panel and the support portion are connected.

7. The instrument panel support apparatus according to claim 1, wherein
the support portion includes a wall portion extended in a vertical direction,
the engaged portion is protruded from a surface of the wall portion to the instrument panel, and
the wall portion includes a concave portion on the surface so that the end of the instrument panel is engaged with the concave portion when the instrument panel and the support portion are connected.

8. The instrument panel support apparatus according to claim 1, wherein
the on-board equipment is a navigation unit including a display unit and a main body, and the instrument panel is provided so as to cover the main body and so that the end of the instrument panel abuts to a housing of the display unit.

9. An instrument panel support apparatus configured to support an end of an instrument panel from on-board equipment mounted on a vehicle, the instrument panel support apparatus comprising:
- a support portion configured by the on-board equipment or a fixing member fixed to the on-board equipment; and
- a connecting portion connecting the support portion and the end of the instrument panel, wherein
the connecting portion includes
- an engaging portion provided at the end of the instrument panel, and
- an engaged portion provided at the support portion so as to be engaged with the engaging portion when the instrument panel and the support portion are connected by pushing of one of the instrument panel and the support portion to the other of the instrument panel and the support portion in a predetermined direction, the engaging portion is configured to engage with the engaged portion in contact with the engaged portion or a periphery of the engaged portion by an elastic deformation of the engaging portion in the connecting portion, the support portion includes a wall portion extended in a vertical direction, the engaged portion is protruded from a surface of the wall portion to the instrument panel, and the wall portion includes a concave portion on the surface so that the end of the instrument panel is engaged with the concave portion when the instrument panel and the support portion are connected.

* * * * *